United States Patent
Hershman et al.

(10) Patent No.: US 11,475,170 B2
(45) Date of Patent: Oct. 18, 2022

(54) SYSTEM AND METHOD FOR CORRECTION OF MEMORY ERRORS

(71) Applicant: NUVOTON TECHNOLOGY CORPORATION, Hsinchu Science Park (TW)

(72) Inventors: Ziv Hershman, Givat Shmuel (IL); Ilan Margalit, Tel-Aviv (IL)

(73) Assignee: NUVOTON TECHNOLOGY CORPORATION, Hsinchu Science Park (TW)

( * ) Notice: Subject to any disclaimer, the term of this patent is extended or adjusted under 35 U.S.C. 154(b) by 229 days.

(21) Appl. No.: 16/423,676

(22) Filed: May 28, 2019

(65) Prior Publication Data

US 2020/0380173 A1    Dec. 3, 2020

(51) Int. Cl.
| | |
|---|---|
| *G06F 21/00* | (2013.01) |
| *G06F 21/76* | (2013.01) |
| *G06F 11/10* | (2006.01) |
| *G06F 21/44* | (2013.01) |
| *H04L 9/32* | (2006.01) |
| *G06F 9/4401* | (2018.01) |
| *G11C 29/52* | (2006.01) |

(52) U.S. Cl.
CPC ............ *G06F 21/76* (2013.01); *G06F 9/4418* (2013.01); *G06F 11/1068* (2013.01); *G06F 21/44* (2013.01); *G11C 29/52* (2013.01); *H04L 9/32* (2013.01)

(58) Field of Classification Search
CPC ........ G06F 21/76; G06F 9/4418; G06F 21/44; G06F 11/1068; G11C 29/52; H04L 9/32
See application file for complete search history.

(56) References Cited

U.S. PATENT DOCUMENTS

| | | | |
|---|---|---|---|
| 6,838,331 B2 | 1/2005 | Klein | |
| 7,073,073 B1 * | 7/2006 | Nonaka | G06Q 20/3829 |
| | | | 380/278 |
| 7,266,747 B2 | 9/2007 | Foss | |
| 7,626,868 B1 | 12/2009 | Wang | |
| 7,937,639 B2 | 5/2011 | Sonnekalb | |

(Continued)

OTHER PUBLICATIONS

"Get NVM Thresholds (Function Index 5)," Oct. 17, 2018, [https://docs.microsoft.com/en-US/windows-hardware/drivers/storage/get-nvm-thresholds-function-index-5].

(Continued)

*Primary Examiner* — Ghazal B Shehni
(74) *Attorney, Agent, or Firm* — Oliff PLC

(57) ABSTRACT

A self-correcting memory system comprising an integrated circuit including memory and memory content authentication functionality, which is operative to compare content to be authenticated to a standard and to output "authentic" if the content to be authenticated equals the standard and "non-authentic" otherwise; and error correction functionality which is operative to apply at least one possible correction to at least one erroneous word entity in said memory, yielding a possibly correct word entity, call said authentication for application to the possibly correct word entity, and if the authentication's output is "authentic", to replace said erroneous word entity in said memory, with said possibly correct word entity thereby to yield error correction at a level of confidence derived from the level of confidence associated with the authentication.

36 Claims, 11 Drawing Sheets

(56) References Cited

U.S. PATENT DOCUMENTS

| | | | |
|---|---|---|---|
| 8,456,919 B1 | 6/2013 | Jeon et al. | |
| 8,817,972 B2* | 8/2014 | Gaborit | H04L 9/32 380/28 |
| 9,525,546 B2 | 12/2016 | Alon | |
| 10,026,488 B2 | 7/2018 | Reusswig et al. | |
| 2002/0087652 A1* | 7/2002 | Davis | G06F 9/505 709/213 |
| 2005/0283566 A1* | 12/2005 | Callaghan | G06F 12/1408 711/104 |
| 2006/0256615 A1 | 11/2006 | Larson | |
| 2007/0089034 A1 | 4/2007 | Litsyn et al. | |
| 2008/0168319 A1 | 7/2008 | Lee et al. | |
| 2008/0222491 A1 | 9/2008 | Lee et al. | |
| 2009/0164704 A1 | 6/2009 | Kanade et al. | |
| 2011/0047604 A1* | 2/2011 | Bolotin | G06F 21/31 726/5 |
| 2013/0235661 A1 | 9/2013 | Wang | |
| 2014/0082721 A1 | 3/2014 | Hershman et al. | |
| 2015/0193302 A1 | 7/2015 | Hyun et al. | |
| 2015/0215128 A1* | 7/2015 | Pal | H04L 63/0815 713/155 |
| 2015/0255164 A1 | 9/2015 | Grant | |
| 2015/0341350 A1* | 11/2015 | Mandal | H04L 63/0838 726/6 |
| 2016/0050067 A1* | 2/2016 | Merchan | H04L 9/0861 713/171 |
| 2017/0255512 A1 | 9/2017 | Zamir et al. | |
| 2018/0062668 A1 | 3/2018 | Moon et al. | |
| 2018/0091308 A1* | 3/2018 | Durham | G06F 12/1408 |
| 2018/0239665 A1 | 8/2018 | Hutton et al. | |
| 2018/0246783 A1 | 8/2018 | Avraham et al. | |

OTHER PUBLICATIONS

Burnett et al., "Natural VT (VT0) distribution of a typical 512k-bit array from two different NVM technologies," Feb. 2002, [https://www.researchgate.net/figure/Natural-VT-VT0-distribution-of-a-typical-512k-bit-array-from-two-different-NVM_fig1_3997562].

"What is 'Margin Read'?," RFID Journal, Jul. 16, 2019, [https://www.rfidjournal.com/blogs/experts/entry?12162].

Keating et al., "Programming and Erasing FLASH Memory on the MC68HC908AS60," Freescale Semiconductor, 2004, pp. 1-60.

"8-bit MCU Knowledge Base," Silicon Labs, Mar. 31, 2016, [https://www.silabs.com/community/mcu/8-bit/knowledge-base, entry, html/2016/03/31/c80511616_marginrea-wjZg ].

Crosby, Bob, "Using Read Margin Modes in TMS470 F05 Flash Microcontrollers," Texas Instruments, Feb. 2006 pp. 1-11.

Geethumol et al., "Read Stability Analysis of 6T SRAM Bit Cell," International Journal of Recent Trends in Engineering & Research, May 2016, vol. 2, No. 5, pp. 155-165.

U.S. Appl. No. 16/588,089, filed Sep. 30, 2019 in the name of Ziv Hershman et al.

"Data Scrubbing"; WIKIPEDIA; https://en.wikipedia.org/wiki/Data_scrubbing; pp. 1-4; Mar. 2019.

"Secure Hash Algorithms"; WIKIPEDIA; https://en.wikipedia.org/wiki/Secure_Hash_Algorithms; pp. 1-2; Mar. 2018.

* cited by examiner

FIG. 2

Operation 10: Provide an integrated circuit in which memory content e.g. code stored in memory, is protected by both Power-up 'strong auth' and On-the-fly 'word auth'

↓

Operation 20: each time on-the-fly word auth fails (e.g. during runtime), the integrated circuit halts or is automatically restarted.

↓

Operation 30: On next power-up (e.g.) all 'word auth' are checked as part of the 'strong auth' computation already being used to protect the memory content. If a 'word auth' fails during power-up auth the integrated circuit attempts to correct the error that has been found in its memory content e.g. by performing operation/s 140 – 170 of Fig. 3.

↓

Operation 80: if the memory is a code execution memory, a suitable Power-fail safe Code recovery update flow may be executed if error correction e.g. performing operation/s 140 – 170 of Fig. 3 results in resolving of corrected code. Once the code has been successfully corrected, the processor can resume running aka normal operation.

FIG. 3

Operation 140: All one bit permutations of the bad word are checked, searching for a match.

↓

Operation 150: If a match is found, the erroneous data or content as corrected or rectified may be digested as part of the 'strong auth' computation.

↓

Operation 160: otherwise, optionally, try to correct more than one error e.g. by searching again, this time over at least some double-bit permutations of the error. It is appreciated that if more than one error (involving more than one bit) can be corrected with high likelihood, but according to some embodiments errors involving plural bits are not corrected because computation is more complicated than for one bit, requiring $\sim X^2/2$ ($\sim 144^2/2$) checks.

↓

Operation 170: If error cannot be corrected, typically an alert is provided to the end-user e.g. via higher level software as shown in Fig. 1.

FIG. 4

Operation 210: Identify the flash pages to be corrected. If there is more than one page, for each, keep (an indication of) the words (addresses + data) that needs to be corrected in volatile memory, then perform operation 220 or operation 230.

Operation 220: correct each page that needs to be corrected, e.g. by performing, for each page, all of operations 310 – 350 in Fig. 5. End.

Operation 230: During boot time, before flash code authentication is performed, the boot code checks if there is a page which is known to be e.g. marked as usable, and if so, the boot code completes all of operations 310 - 350 before continuing the boot. Otherwise, some higher level firmware may perform 'garbage collection'.

FIG. 5

Operation 310: Write the flash page address and corrected data (code) in a reserved predefined flash page and verifies that it was written correctly.

↓

Operation 320: Set a bit in the reserved page that indicates e.g. to other firmware that this page carries valid info, or is in use and should not be erased.

↓

Operation 330: Erase original flash page (that in which error/s was/were found in operation 210 of Fig. 4)

↓

Operation 340: Update original flash page with corrected data from the reserved flash page and verify that it was written correctly

↓

Operation 350: Erase the reserved page to enable future use thereof for correction of errors in other pages

FIG. 6

Operation 1001 – Fill the memory zone with contents, e.g. code, which includes a multiplicity of words. For each word, compute the "word auth" while writing, and store the "word auth"

↓

Operation 1002 – Run "strong auth" over the memory contents and store result

↓

Operation 1003 – Use the memory as usual including performing memory reads. Each memory read includes: computation of a current aka recomputed "word auth" , reading from memory, the pre-computed word-auth stored in Operation 1001, and comparing the two. If recomputed "word auth" equals the pre-computed word-auth read from memory, else enter error correction sequence.

FIG. 7

Operation 1006 – perform error correction on content to be corrected including the word and its associated word auth, combined.

Operation 1008 – flag uncorrectable memory contents, and/or halt system, and/or processor 1 may prompt for higher level recovery Operation 1009 – Do "strong auth" including computing a digest e.g. HMAC for the whole memory zone, thereby to yield a strong-auth result. Typically, strong auth yields a digest/MAC/signature.

Operation 10010 – Compare the strong auth result to the pre-computed pre-computed strong-auth result stored in memory in Operation 1002. If the results are equal, there is a strong-auth match; otherwise (unequal) there is a strong-auth mismatch.

Operation 10011 – If there is a strong auth match – memory contents is qualified after correction, continue using memory as usual e.g. go to Operation 1003

Operation 10012 – else i.e. If there is a strong auth mismatch – perform mismatch process e.g. as in Fig. 8.

FIG. 8

Operation 10012.5: scan the whole memory 2 in Fig. 1, e.g. by redoing Operation 1006, but correct all identified errors.

Operation 10013 – redo strong auth e.g. by redoing Operations 1009 – 11.

Operation 10014 – If strong auth now fails, flag uncorrectable memory contents

SYSTEM AND METHOD FOR CORRECTION OF MEMORY ERRORS

REFERENCE TO CO-PENDING APPLICATIONS

None.

FIELD OF THIS DISCLOSURE

The present invention relates generally to integrated circuits, and more particularly to protecting IC (Integrated Circuit) memory content.

BACKGROUND FOR THIS DISCLOSURE

State of the art systems in the general field of the invention include the following patent documents:
U.S. Pat. No. 6,838,331B2
U.S. Pat. No. 9,525,546B2
US20070089034A1
US20080168319A1
US20090164704A1
US20080222491A1
U.S. Pat. No. 7,266,747B2
US20060256615A1
U.S. Pat. No. 7,937,639B2 (Infineon 2006)
US20170255512A1
U.S. Pat. No. 10,026,488B2 (Sandisk)
US20180239665A1
US20180246783A1 (Sandisk 2016)
US20180091308 to Durham.

Wikipedia's entry on scrubbing (https://en.wikipedia.org/wiki/Data_scrubbing) states that Data Integrity (reducing data corruption) is crucial e.g. for prevention of hardware or software failure in operating systems, storage systems or data transmission systems which are all configured for extensively writing, reading, storing, transmission, and processing of data in memory, disk arrays, file systems, FPGAs or elsewhere. To facilitate integrity, data scrubbing is performed by checking for inconsistencies in data. Data scrubbing is a form of error correction, using a background task to periodically inspect memory and detect errors, then correct any errors detected using available redundant data e.g. checksums or copies of the data in which the error was detected. Absent Data scrubbing, single errors which are correctable tend to accumulate to multiple, uncorrectable errors, making it advantageous to address data errors while they are still small enough to be correctable.

The disclosures of all publications and patent documents mentioned in the specification, and of the publications and patent documents cited therein directly or indirectly, are hereby incorporated by reference. Materiality of such publications and patent documents to patentability is not conceded.

SUMMARY OF CERTAIN EMBODIMENTS

Certain embodiments seek to provide a system for testing possible corrections of memory errors, using memory authentication functionality not only to identify errors, but also to verify (or not) various possible corrections.

Certain embodiments seek to provide a method for error correction including applying at least one possible error correction and then using an integrated circuit's existing authentication functionality to verify whether the possible error correction is correct.

Certain embodiments seek to provide an error correction solution which, unlike conventional error correction solutions, does not generate overhead in memory (as opposed, say to ECC, which requires x bits to be stored per y amount of data). This is because "evaluation" of the data utilizes authentication, an existing functionality in conventional, e.g. security—and integrity—aware memory management, which inevitably involves its own overhead and is harnessed as described herein for error correction, such that typically no overhead over and above the authentication's natural overhead, is required.

It is appreciated that applicability of embodiments herein extends inter alia to any general microcontroller performing any function/s, that has a processor and memory. These functions are typically operated by the FW executed by the processor; the FW resides in the memory and may itself be (included in) the memory content that is sought to be secured.

It is appreciated that certain embodiments herein may be used with a legacy ic, parsimoniously utilizing (portions of) the legacy ic's own legacy auth whose crypto computations may be done either in HW or FW; HW is typically provided for storing the auth digests. firmware using regular CPU instructions may be employed, or HW accelerators may be used. For example, if HMAC is used for the strong auth, and the legacy IC has a piece of crypto HW operative to perform HMAC, the firmware may utilize this piece of legacy hardware in the legacy IC if the legacy hardware is accessible for the processor of the subject IC hence accessible for the FW the processor is executing.

Alternatively or in addition, (portions of) access control functionality in the IC's legacy HW and/or FW may be employed.

Alternatively or in addition, an existing IC's legacy HW and/or FW are not employed to implement the embodiments herein and instead, (some or all of) the functionality described herein is implemented in suitable FW which is added to the mutable code of the existing ic's legacy FW.

There are thus provided at least the following embodiments:

Embodiment 1. A self-correcting memory system comprising:
an integrated circuit including:
memory and
memory content authentication functionality, which is operative to compare content to be authenticated to a standard and to output "authentic" if the content to be authenticated equals the standard and "non-authentic" otherwise; and
error correction functionality which is operative to apply at least one possible correction to at least one erroneous word entity in the memory, yielding a possibly correct word entity, call the authentication for application to the possibly correct word entity, and if the authentication's output is "authentic", to replace the erroneous word entity in the memory, with the possibly correct word entity
thereby to yield error correction at a level of confidence derived from the level of confidence associated with the authentication.

It is appreciated that comparison of content to be authenticated to a standard typically involves computing some derivative of the content to be authenticated, such as a digest thereof, and comparing that derivative (rather than directly comparing the actual raw content) to a standard.

Embodiment 2. A system according to any of the preceding embodiments wherein the authentication functionality is operative to perform cryptographically strong authentication.

Embodiment 3. A system according to any of the preceding embodiments wherein the authentication functionality is also operative to perform word-authentication.

Embodiment 4. A system according to any of the preceding embodiments wherein the Error correction functionality is configured for:

applying at least one possible correction to at least one erroneous word in the memory, yielding a possibly correct word, calling the word-authentication for application to the possibly correct word, if the word-authentication's output is "authentic", to subsequently call the strong authentication for application to the possibly correct word, and if the strong-authentication's output is "authentic", to replace the erroneous word in the memory, with the possibly correct word, thereby to yield error correction at a level of confidence derived from the level of confidence associated with the strong authentication and/or word-authentication.

Embodiment 5. A system according to any of the preceding embodiments wherein the erroneous word is detected by word-authentication applied to at least one word in the memory and wherein any word which yields a "non-authentic" output is considered erroneous and any word which yields an "authentic" output is considered non-erroneous.

Embodiment 6. A system according to any of the preceding embodiments wherein the correction comprises a flip of at least one bit in the erroneous word entity from 0 to 1 or from 1 to 0.

Embodiment 7a. A system according to any of the preceding embodiments wherein possible corrections are applied to plural erroneous words yielding plural possibly correct words, and wherein said strong authentication is called once for application to a revised memory image/chunk in which all of said plural erroneous words are replaced with said possibly correct words respectively, rather than calling said strong authentication plural times for application to memory images/chunks respectively including said plural possibly correct words respectively, thereby to save memory and/or correction time.

Embodiment 7b. A system according to any of the preceding embodiments wherein possible corrections are applied to plural erroneous words yielding plural possibly correct words, and wherein the strong authentication is called once for application to all of the plural possibly correct words rather than calling the strong authentication plural times for application to the plural possibly correct words respectively, thereby to save memory and/or correction time.

Embodiment 8. A system according to any of the preceding embodiments wherein at least first and second possible corrections are applied to at least one erroneous word and wherein any bit in the erroneous word which is flipped in the first correction is unflipped before the second possible correction is applied to the erroneous word, thereby to undo the first possible correction of the erroneous word before applying the second possible correction to the same erroneous word.

Embodiment 9. A system according to any of the preceding embodiments wherein all possible corrections are applied to at least one erroneous word.

Embodiment 10. A system according to any of the preceding embodiments wherein the erroneous word to which all possible corrections are applied comprises an erroneous word for which none of the possible corrections tried results in correct word authentication, until the last possible correction is tried, in which case the erroneous word is regarded as uncorrectable.

Embodiment 11. A system according to any of the preceding embodiments wherein at least one heuristic is employed to determine a subset of possible corrections including less than all possible corrections and wherein only possible corrections in the subset are applied to at least one erroneous word, even if none of the possible corrections in the subset results in correct word authentication.

It is appreciated that heuristics may be used to generate subset of candidate corrections aka possible corrections, and/or may be used to prioritize candidate corrections such that the right corrections, for a given use-case, are more likely to be found earlier whereas less likely corrections are tested only later (e.g. only if the more likely corrections are not verified).

Typically, if a given subset of priority possible corrections are not verified, the system defaults to the rest of the possible corrections (which were deemed lower priority because they were deemed less likely, a priori, to be verified).

Embodiment 12. A system according to any of the preceding embodiments wherein the authentication functionality, operative to compare content to be authenticated to a standard, is operative to apply strong auth to the content to be authenticated which is stored at a given memory location, at a time t2, thereby to yield a "computed" auth value, and to compare the computed auth value to a stored result, aka expected auth value, generated by applying strong auth to content of the memory, at the given memory location, at a previous time t1 earlier than t2.

Embodiment 13. A method providing error correction functionality for memory content which resides on an integrated circuit's target (non-volatile or volatile) memory, the method comprising at least once:

b. Detecting an error in memory content residing in target memory c. Searching, through at least some bit-permutations constituting respective possible fixes of the error, for at least one on-the-fly signature match, thereby to define a proposed fix which achieves successful strong auth d. If at least one on-the-fly signature match is found, using overall authentication as a final verification for the proposed fix, e. if verified, correct the code, using a power-fail safe code recovery update process, thereby to provide error correction for the target memory without taking the target memory to a lab.

Embodiment 14. A method according to any of the preceding embodiments and also comprising providing an output indication that memory recovery is needed e.g. by taking at least the target memory to a lab for complete reprogramming, because memory content correction has failed.

Embodiment 15. A method according to any of the preceding embodiments wherein, before providing the output indication, the searching is performed only over single-bit permutations of the error.

Embodiment 16. A method according to any of the preceding embodiments wherein, before providing the output indication, the searching is performed over all single-bit and double-bit permutations of the error.

Embodiment 17. A method according to any of the preceding embodiments wherein, before providing the output indication, the searching is performed over all single-bit permutations of the error and if no match is found, then the searching is again performed, this time over at least some double-bit permutations of the error.

Embodiment 18. A method according to any of the preceding embodiments and also comprising protecting memory content residing on target memory, before the detecting, both by strong-auth performed once and by on-the-fly word auth.

Embodiment 19. A method according to any of the preceding embodiments wherein the strong-auth performed once comprises strong-auth performed just after the integrated circuit wakes up from a less active state.

Embodiment 20. A method according to any of the preceding embodiments wherein the strong-auth performed once comprises strong-auth performed just after the integrated circuit powers-up.

Embodiment 21. A method according to any of the preceding embodiments wherein the strong-auth performed once comprises strong-auth performed just after the integrated circuit exits a sleep state.

Embodiment 22. A method according to any of the preceding embodiments wherein the memory content comprises code stored in the target memory.

Embodiment 23. A system according to any of the preceding embodiments wherein the error correction functionality is operative to apply at least one possible correction to at least one erroneous word in the memory, yielding a possibly correct word, call the authentication for application to the possibly correct word, and if the authentication's output is "authentic", to replace the erroneous word in the memory, with the possibly correct word.

Embodiment 24. A system according to any of the preceding embodiments wherein the error correction functionality is operative to apply at least one possible correction to at least one erroneous word entity's word auth, yielding a possibly correct word entity, call the authentication for application to the possibly correct word entity, and if the authentication's output is "authentic", to replace the erroneous word auth in the memory, with the possibly correct word auth.

Embodiment 25. A system according to any of the preceding embodiments wherein the previous time t1 is a time at which a firmware update of the memory occurred.

Embodiment 26. A computer program comprising instructions which, when the program is executed by a processor, cause the processor to carry out one or more operations within one or more of the above methods.

Embodiment 27: A system comprising at least one processor, typically operative in conjunction with corresponding, dedicated hardware, configured to carry out at least one of the operations of one or more of the methods herein.

The following terms may be construed either in accordance with any definition thereof appearing in the prior art literature or in accordance with the specification, or to include in their respective scopes, the following:

Access control: intended to include any conventional access control functionality, typically associated with the interface between processor and memory, may be implemented as a virtual-logical entity including hardware and firmware.

Target memory: may include any memory array within an integrated circuit aka IC, the array typically including pages of memory, some in use, and some free. Any free page not currently in use, may be considered a *reserved* page.

When using a reserved page e.g. as a very short term warehouse while updating memory pages, the method typically verifies that what the reserved page contains is exactly what was written to it (e.g. by comparing the contents of the reserved page in real time to the data that was copied to the reserved page and ensuring both are identical). If this is not the case, the reserved page's content should be erased and redone by rewriting onto the reserved page. Verification may include reading the reserved page right after writing thereupon to ensure that writing was successful, resulting in data being stored on that reserved or spare page that is correct e.g. exactly what was written.

'strong authentication' (aka 'strong auth'): may include an algorithm or process which authenticates memory content; may employ digest/secured key-based HASH function, like HMAC aka Hash-based message authentication code or CMAC aka Cipher-based Message Authentication Code, e.g. on a large code or persistent data segment.

The authentication code used for strong auth may be based on a secure hash function such as SHA (SHA-1, SHA-2) or HMAC (e.g. https://en.wikipedia.org/wiki/Secure_Hash_Algorithms).

Typically, 'strong auth' herein yields a single value that vouches for an entire data section or image or image chunk representing content to be secured [such as but not limited to code] which enables integrity of content of an entire data section or image or image chunk to be verified not just for a specific corresponding row or column as in conventional 2D horizontal/vertical error correction schemes.

Typically strong auth authenticates memory content at a higher level of confidence than word auth. Thus "Strong auth" as used herein is intended to include any algorithm or any message authentication code scheme which produces a digest which is small e.g. relative to that of the "word auth" algorithm referred to herein, thus, as opposed to word auth, may be regarded as irreversible, i.e. impossible to reproduce the original plaintext from the digest.

Typically, after rectifying or correcting an error in a specific data word within the memory content (which may be identified by auth), and replacing the data+auth with the rectified data+auth, the strong auth for the whole contents is recomputed and compared to the stored, pre-computed strong auth or digest.

Strong-auth is typically applied to a given body of data (in which at least one erroneous word is replaced with its proposed correction respectively) e.g. to an entire memory image or to only a chunk thereof, depending on the body of data to which the recomputed strong auth is to be compared e.g. depending on whether the stored, pre-computed strong auth to which the recomputed strong auth is to be compared, was pre-computed on the entire memory image (in which, typically, an erroneous word is replaced with its proposed correction)

or only on a chunk thereof (ditto). The strong auth is typically considered "successful" if the re-computed strong auth and the pre-computed, aka expected strong auth, are exactly equal.

'strong auth' may occur upon FW request which is typically from the application system, aka higher level system utilizing and incorporating the integrated circuit (see FIG. 1). Alternatively or in addition, 'strong auth' may occur may occur upon request from application FW being executed on a given IC (integrated circuit) containing the memory content in which it is sought to correct errors. Typically, the recipient of the request is operative to re-authenticate itself responsive to a certain trigger (e.g. as per FIG. 12) resulting from events such as, say, an attack identified in some other IC or system element. The higher level system is thus one possible source of requests to perform functionalities described herein, such as authentication e.g. strong auth, and so may be FW and hardware events within the IC.

word: may include any piece of data which is much smaller than the memory is e.g. 16 bits of data, or 128 or 256 bits of data, or more, out of a memory array which may contain, say, thousands of words. Typically a word is the smallest piece of data retrieved from memory, which has its own auth code.

Word auth aka signature match: may include a digest of the "word" being authenticated.

on-the-fly signature match: Every time a word is read, read the word auth at the same time. Typically, the bit structure's length is the length of the data plus the length of the auth. At the same time the auth is re-computed based on the word as read, and is then compared to the auth read with the word. Match occurs when the re-computed auth equals the auth read from memory.

Overall authentication: may include strong auth, which operates on the entire contents of the memory that a system seeks to manage. Typically, if the digest of the contents at any time, and specifically after data correction, is the same as pre-computed, then the content now, at the time of re-authentication, can be regarded as identical to the content at the time of pre-computation hence strong-auth is successful hence, in case executed immediately after data correction, the proposed correction or proposed fix is correct or authenticated or confirmed.

Digest: may include algorithm (used e.g. for strong auth) which generates a hash from content, the hash enabling the integrity of the content to be verified e.g. whether or not the content has changed or (for memory with controlled access) has undergone an unauthorized change or been tampered with. Thus digest and hash are used generally interchangeably herein, and are both used both a noun and a verb.

HMAC algorithm: typically, a MAC algorithm that uses a hash (rather than, say, encryption), internally, to generate a MAC.

on-the-fly: e.g. concurrently with another ongoing process. For example, in authentication, a digest may be computed and compared to an expected value while data to be authenticated is still being read, or may be computed and written to the memory during the write operations (of the content).

For example, on-the-fly encryption, decryption and authentication are described in the following co-pending patent document, the disclosure of which is hereby incorporated by reference:

https://patents.google.com/patent/US9525546B2/en error verification: may include determining whether there is a match or a mismatch (equal or non-equal) between computed "strong auth" of memory at time t2 and pre-computed/stored (aka expected) "strong auth" computed over the same memory zone, at time t1 which precedes time t2.

Typically, the Pre-computed strong auth comprises a strong auth digest for the entire contents of the memory space or array whose integrity is sought to be protected using embodiments herein.

Stacked flash: may include a chip, which may be referred to as a "vertical" or "3d" chip, which yields ultra high density storage and reduces bit costs by having plural (sometimes dozen) of layers or dies of memory deployed one atop another. May use BiCS (Bit Cost Scaling) or a punch and plug process. It is appreciated that the embodiments herein are applicable to memory in general, including but not limited to stacked flash and other flash/NVM technologies.

Overhead: may include redundancy in memory capacity which is typically disadvantageous e.g. in terms of die area and/or product cost. For example, implementing error correction with error correction codes (ECC) typically means X bits of ECC added to Y bits of data/auth info, translating to overhead or extra memory capacity of (Y/X)*100% for error correction.

word entity: may include data stored about a word in memory, including the word itself (aka word bits), plus word auth (aka auth bits) relating to that word; the word auth is termed herein the word's "corresponding" word auth. According to certain embodiments, the bits in the word portion and the bits in the auth portion are both scanned or flipped, but for the word, computations are typically performed, whereas for the auth comparisons are typically performed, all e.g. as described herein.

The following acronyms are employed herein: ECC (Error-correcting code); FW (firmware), NVM (non-volatile memory), ASIC (application-specific integrated circuit), DSP (digital signal processing) and HMAC (hash-based message authentication code), is (integrated circuit), hw (hardware).

Embodiments referred to above, and other embodiments, are described in detail in the next section.

Any trademark occurring in the text or drawings is the property of its owner and occurs herein merely to explain or illustrate one example of how an embodiment of the invention may be implemented.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of at least one computer/s or computing system/s, or processor/s or similar electronic computing device/s, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, embedded cores, computing systems, communication devices, processors (e.g. digital signal processor (DSP), microcontrollers, field programmable gate array (FPGA), application specific integrated circuit (ASIC), etc.) and other electronic computing devices.

Elements separately listed herein need not be distinct components and alternatively may be the same structure. A statement that an element or feature may exist is intended to include (a) embodiments in which the element or feature exists; (b) embodiments in which the element or feature does not exist; and (c) embodiments in which the element or feature exist selectably e.g. a user may configure or select whether the element or feature does or does not exist.

BRIEF DESCRIPTION OF THE DRAWINGS

Certain embodiments of the present invention are illustrated in the following drawings:

FIG. 2 is a simplified flowchart illustration of a flow for combining authentication with error correction.

FIG. 3 is a simplified flowchart illustration of an example flow for performing operation 30 in FIG. 2.

FIG. 4 is a simplified flowchart illustration of an example flow for carrying out error correction and verification when the memory is page-based nonvolatile memory.

FIG. 5 is a simplified flowchart illustration of an example flow for performing operation 220 in FIG. 4.

FIG. 6 is a simplified flowchart illustration of a flow for operation of the integrated circuit of FIG. 1.

FIG. 7 is a simplified flowchart illustration of a suitable error correction sequence flow, including testing possible error corrections.

FIG. 8 is a simplified flowchart illustration of an example flow for performing operation 10012 in FIG. 7.

Methods and systems included in the scope of the present invention may include some (e.g. any suitable subset) or all of the functional blocks shown in the specifically illustrated implementations by way of example, in any suitable order e.g. as shown.

Computational, functional or logical components described and illustrated herein can be implemented in various forms, for example, as hardware circuits such as but not limited to custom VLSI circuits or gate arrays or programmable hardware devices such as but not limited to FPGAs, or as software program code stored on at least one tangible or intangible computer readable medium and executable by at least one processor, or any suitable combination thereof. A specific functional component may be formed by one particular sequence of software code, or by a plurality of such, which collectively act or behave or act as described herein with reference to the functional component in question. For example, the component may be distributed over several code sequences such as but not limited to objects, procedures, functions, routines and programs, and may originate from several computer files which typically operate synergistically.

Any logical functionality described herein may be implemented as a real time application, if and as appropriate, and which may employ any suitable architectural option such as but not limited to ASIC or DSP or any suitable combination thereof. Any hardware component mentioned herein may in fact include either one or more hardware devices e.g. chips, which may be co-located or remote from one another.

DETAILED DESCRIPTION OF CERTAIN EMBODIMENTS

IC makers are eager to secure the contents of their integrated circuits' memories.

The embodiments herein are applicable to memories of many different technologies, hence the term "flash" when used herein is used only by way of example.

A system for ensuring integrity of memory content, in ICs, is described in detail. Typically, access to such memory is controlled; a digest may be used to sign a controlled, hence authorized memory update. Thus, any change in the memory which is not a result of that controlled access, is an undesirable error, whether malicious or, perhaps, due to a transitional physical or electrical failure e.g. of the physical memory itself. The system herein is operative to test possible corrections for errors, reducing "out-of-order" time for the computer or other product in which the integrated circuit is embedded. Typically, (one or more levels of) authentication functionality, which the integrated circuit typically needs for other purposes anyhow, is used to verify or approve possible corrections, such as using word-auth for discovering errors and initially verifying proposed corrections thereof, and using strong-auth for finally verifying proposed corrections.

Figure 1:
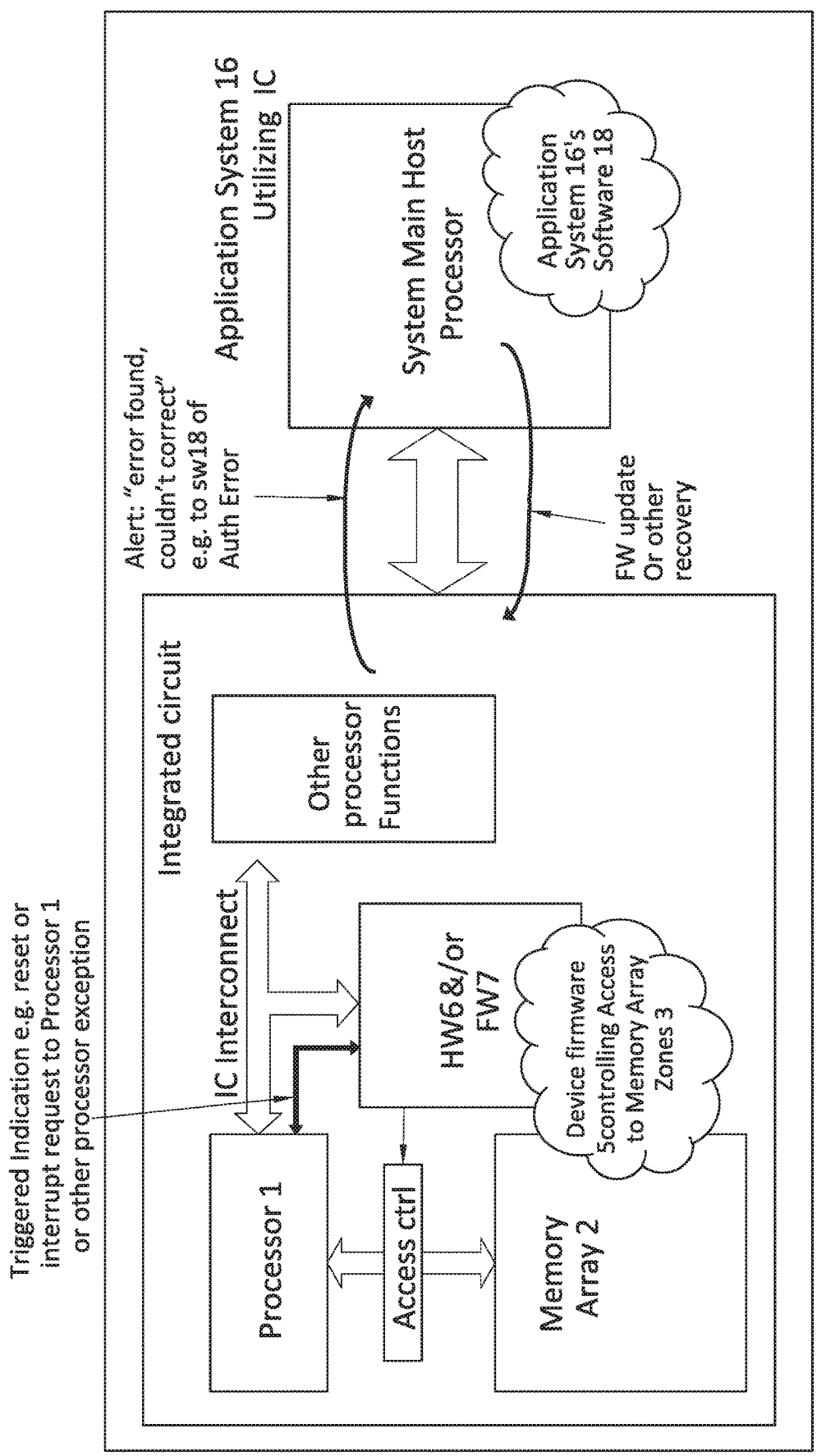
FIG. 1 is a diagram of an integrated circuit which has some function/s (aka "other functions") to fulfill and which has error correction functionality, including functionality which harnesses authentication for testing possible error corrections, all according to an embodiment of the invention.

Certain embodiments provide error detection and recovery (aka error correction) functionality in integrated circuits whether by providing integrated circuits such as that shown in FIG. 1, or by modifying existing integrated circuits e.g. by adding software over the existing ICs. The software may reside in another, typically independent memory space of the same IC, having access authorization to the memory space the system seeks to secure and typically being operative to perform auth e.g. word auth and/or strong auth and/or to accomplish the error correction and/or verification thereof e.g. as described herein.

Certain embodiments provide error detection and recovery functionality in integrated circuits including detection (e.g. based on conventional authentication) for identifying events in which memory contents has been altered, and recovering from these events to enable the IC (and the device e.g. pc in which the IC is embedded) to continue operating as usual with as little as possible overhead for the end-user of the device. This is particularly advantageous because this means that some events, which today cause a PC, for example, which an end-user is working on, to "break", and necessitates the end-user to take his computer to a lab to fix, will not need this according to certain embodiments described herein, because the component with the memory fault rectifies itself by itself, thereby maintaining the security of the system.

The error correction functionality may be implemented as any suitable combination of HW and FW. the memory is typically configured to support the structure of auth+word auth. Typically, on-the-fly word auth is implemented in hardware (while reading the memory). The strong auth is typically implemented in firmware, typically using suitable crypto HW to accelerate the process. bit flipping+consistency check may be implemented in either FW or HW. The actual update of memory contents to correct an error is typically done by FW, in view of the complex operations, e.g. NVM erase and re-write, which are sometimes involved.

The system of FIG. 1 shows an integrated circuit according to certain embodiments, which may be embedded in a higher level system 16. The higher level system 16 of FIG. 1 is one possible source of requests to perform functionalities described herein, such as authentication e.g. strong auth.

Alternatively or in addition, the higher level system may serve as an access path via which the memory array 2 in FIG. 1 legitimately gets its original contents (e.g. code stored in the memory array 2) or is subsequently updated, i.e. the memory array's content is replaced with different content.

Access control functionality (e.g. as shown in FIG. 1) is typically, a combination of HW and FW. Typically, there is HW which defines which memory zones can and cannot be accessed. Firmware may, at a certain privilege level, have access to that HW which controls memory access. Thus, updating memory content may be done by "convincing" the FW that permission to do so exists, in which case the FW would open the gate and update the memory.

Functionality for testing possible error corrections e.g. as per the method of FIG. 7, may comprise a separate state machine which may be implemented, say, in hardware or firmware (see hw 6 and/or fw 7 in FIG. 1). Also, the logic of the error correction functionality may also be implanted in any suitable combination of hardware and firmware The system of FIG. 1, or any subset of the blocks illustrated therein, may be provided in conjunction with all or any subset of the embodiments of FIGS. 1, 9, 10 and 11; and/or in conjunction with all or any subset of the flows illustrated in FIG. 2 onward.

FIG. 2 onward illustrate schemes or methods for combining authentication with error correction which is economical in terms of memory overhead, since conventional ECC requires memory capacity for storing ECC bits per piece of data. In contrast, embodiments herein obviate use or storage of error detection or correction code by utilizing on-the-fly (say) authentication which exists in an existing design, or must be provided in a new design, in any event, for error correction without compromising security level. The security level is typically not at all compromised because, when using ECC, an attacker may modify both data and its ECC, such that no error is identified in real time because both the data and ECC are revised to match one another. Instead, the system may only identify an error when either word auth or strong auth is executed.

It is appreciated that the term overhead may be used herein to include storage needs engendered by authentication, or by error correction, or other memory management processes which may be stored in any suitable location. For example, in word auth (aka word-level auth) or word ECC, the memory may be produced with a wider word length, thus the auth/ECC may be stored right next to the word, such that when reading the word, the auth/ECC bits are accessed as well. Or, in hardware systems, an additional memory component read may be implemented concurrently with reading the actual payload desired (as opposed to its auth/ecc bits), to allow effectively greater word length since the memory's entire word length may then be devoted to the actual payload, with the payload's auth/ecc bits stored elsewhere.

The method of FIG. 2 may include all or any subset of the following operations, suitably ordered e.g. as shown.

10: Provide an integrated circuit in which memory content e.g. code stored in memory, is protected by both:
  Power-up 'strong auth' (e.g. HMAC or CMAC, say on a large code segment)—e.g., against cold flash content replacement
  On-the-fly 'word auth' (say 128 bit payload+16 bit auth)—e.g., against hot flash content replacement e.g. when executing code straight from flash.

on-the-fly encryption, decryption and authentication are described in the following co-pending patent document, the disclosure of which is hereby incorporated by reference:
  https://patents.google.com/patent/US9525546B2/en

20: each time on-the-fly word auth fails (e.g. during runtime), the integrated circuit halts (e.g. until next power-up) or is automatically restarted. For example, assume there is code in the memory space that is to be secured. Reading from the memory thus typically means that a processor in the IC is fetching code from that memory space, which in turn typically means that if a word auth failure is identified, the subject processor just fetched altered code. At this point the processor may be halted, to prevent execution of altered code, and recovery typically needs to start. Recovery may include, say, jumping to another code which is known to be 100% secure, e.g. code in ROM, or resetting to restart execution from ROM, which triggers error correction and/or verification e.g. as described herein, whether by software or by hardware.

30: On next power-up (or as per the above example) all 'word auth' are checked as part of the 'strong auth' computation already being used to protect the memory content. If a 'word auth' fails during power-up auth (as opposed to during runtime), this constitutes error detection, and therefore the integrated circuit attempts to correct the error that has been found in its memory content e.g. by performing all or any subset of operations 140-170 of FIG. 3.

80: if the memory is a code execution memory, a suitable Power-fail safe Code recovery update flow may be executed if error correction e.g. performing all or any subset of operations 140-170 of FIG. 3 results in resolving of corrected code. Once the code has been successfully corrected, the processor can resume running aka normal operation.

The method of FIG. 3 may include all or any subset of the following operations, suitably ordered e.g. as shown.

140: All one bit permutations (say: 128+16 permutations in the illustrated embodiment) of the bad word (word in which error was found e.g. because 'word auth' failed for this word, during power-up auth) are checked, searching for a match. It is emphasized that any suitable proportion may exist between the data and authportions; the 128 and 16 bit parameters are merely illustrative.

A dedicated HW or SW may quickly scan all permutations (e.g. on memory or as part of memory control and interface unit without needing to iteratively write-to/read-from memory e.g. flash).

According to certain embodiments, a dedicated buffer holds the data structure of the bad word, where the bad word may be manipulated bitwise. Dedicated firmware code, or a hardware state machine, then scans permutations of the data structure, flipping one bit (see e.g. FIG. 10, 'Flip One Bit' block), or more, at a time. For each permutation, the word auth is computed for the then-current, manipulated, bit-flipped data structure.

It is appreciated, generally, that scanning of permutations may be accomplished by firmware, or, alternatively, may be accomplished by dedicated hardware.

150: If a match is found, the erroneous data or content as corrected or rectified (e.g. the proposed correction of erroneous content) may be digested as part of the 'strong auth' computation. Depending on the auth algorithm and the number of corrected bits, it may be that more than one match may be found. In this case, all permutations of matching bit combinations, aka patterns, may be tried and the one that yields the correct 'strong auth' is taken. Correct typically means that the result of strong auth with (or applied to) the rectified code is equal to the pre-computed result of strong auth with (or applied to) the original contents of the memory.

For example, for one-bit errors the method may include flipping a first bit e.g. bit 0 and checking auth; then subsequent bits e.g. bit 1, 2 etc. until a match is found. For 2 bit errors, each pair of bits may be flipped and each possible pair of values for the two bits is typically considered separately.

160: otherwise, optionally, try to correct more than one error e.g. by searching again, this time over at least some double-bit permutations of the error. It is appreciated that if more than one error (involving more than one bit) can be corrected with high likelihood, but according to some embodiments errors involving plural bits are not corrected because computation is more complicated than for one bit, requiring $\sim X^2/2$ ($\sim 144^2/2$) checks.

170: If error cannot be corrected, typically an alert is provided to the end-user e.g. via higher level software as shown in FIG. 1.

FIG. 4

FIG. 4 is a method for carrying out error correction and verification when the memory is page-based nonvolatile memory. Typically, in such memory one can only erase whole pages (or the entire memory). Thus when an error is found that needs to be corrected, page juggling is typically performed to enable the correction to be applied e.g. copying the page with the correction to some reserved page while applying the correction. More generally, it is appreciated that the present invention includes corrections which are made under memory usage restrictions.

The method of FIG. 4 may be performed at any suitable time e.g.

1—Immediately upon error detection (operation 220 below).
2—Upon the next IC boot (operation 230 below).

The method of FIG. 4 may include all or any subset of the following operations, suitably ordered e.g. as shown.

Operation 210: Identify the flash pages to be corrected. If there is more than one page, for each, keep (an indication of) the words (addresses+data) that needs to be corrected in volatile memory. Next, perform operation 220 to correct immediately, or operation 230, to correct after the next boot.

Operation 220: correct each page that needs to be corrected, e.g. by performing, for each page, all of operations 310-350 in FIG. 5. End.

Operation 230: During boot time, before flash code authentication is performed, the boot code checks if there is a page which is known to be e.g. marked as usable, and if so, the boot code completes all or any subset of operations 310-350 before continuing the boot. Otherwise, some higher level firmware may perform 'garbage collection', e.g. condensing memory contents to occupy the smallest possible memory space, thus freeing at least one page for the temporary purpose of error correction.

The method of FIG. 5 may include all or any subset of the following operations, suitably ordered e.g. as shown.

Operation 310: Write the flash page address and corrected data (code) in a reserved predefined flash page and verifies that it was written correctly.

Operation 320: Set a bit in the reserved page that indicates e.g. to other firmware that this page carries valid info, or is in use and should not be erased. The bit is also useful in case the system of the present invention is interrupted, e.g. by user power-off, and seeks to resume operation thereafter.

Operation 330: Erase original flash page (that in which error/s was/were found in operation 210 of FIG. 4)

Operation 340: Update original flash page with corrected data from the reserved flash page and verify that it was written correctly Operation 350: Erase the reserved page to enable future use thereof for correction of errors in other pages Variants re what triggers performance of the error detection/correction method of FIG. 2 onward may include:

I. On the fly: respond to word auth failures by a memory check right away: if a word auth mismatch is found while reading from the target memory, the process is gone through before whatever comes next in the execution sequence of the processor doing the execution.

For example, if code from the memory is being executed, and during code fetch word auth failure is identified, execution typically halts to allow, say, the whole memory space or array to be scanned for failures or errors. Thereafter, the halt is terminated, and whatever comes next in the execution sequence of the processor is executed, or execution may be restarted from the beginning of the code. In the case of data which is not code, there may be an indication of error during data read, in which case, again, the processor may halt and the memory scanning/correction/verification may be triggered.

II. Power-up: triggered by each event of the integrated circuit waking up from a less active state e.g. power up, or change of state from sleep to active, the strong auth is recomputed, compared to the pre-computed strong auth, and in case of a mismatch between the re-computed and pre-computed strong auth, the error correction mechanism is invoked as described above.

III. Periodic aka scrubbing: upon occasion, the strong auth is recomputed, compared to the pre-computed strong auth, and in case of a mismatch between the re-computed and pre-computed strong auth, the process of memory error correction as described herein may be invoked. This trigger may be implemented, say, using some programmable timer which gives an indication of a time at which the above is to be performed.

This typically has some penalty because regular operation of the integrated circuit is disturbed and interrupted, but greater protection is achieved.

IV. Initiated: triggered by external event, e.g. if a device aka integrated circuit identifies e.g. using hardware or firmware hack detection which may be present in the IC, an attempt of hacking, or possibly some other functional error, the strong auth is recomputed, compared to the pre-computed strong auth, and in case of a mismatch between the re-computed and pre-computed strong auth, the process of memory error correction as described herein may be invoked.

V. Access-triggered: check the whole target memory each time the memory is accessed; practical e.g. for code which gets executed infrequently. This embodiment is suitable e.g. if the memory is accessed very rarely and real-time data integrity is imperative such that performance overhead is relatively unimportant.

It is appreciated that all or any subset of the above variants may be provided, in any given device.

A flow for operation of the integrated circuit of FIG. 1, which may be controlled or put into effect by processor 1 of FIG. 1, is shown in FIG. 6 and may include all or any subset of the following operations, suitably ordered e.g. as follows:

Operation 1001—Fill the memory zone with contents, e.g. code, which includes a multiplicity of words. For each word, compute the "word auth" while writing, and store the "word auth" e.g. adjacent to the word.

Operation 1002—Run "strong auth" over the memory contents and store the result somewhere in the memory (may be pre-computed e.g. by an entity preparing the memory image offline, which has the capability of executing strong auth] and provided to the IC in which the secured memory array 2 resides.

It is appreciated that not uncommonly, a memory image is prepared outside an IC and "injected" into the IC for programming together with authentication code attached to the contents.

Operation 1003—Use the memory as usual including performing memory reads. Each memory read includes:

computation of a current aka recomputed "word auth", reading from memory, the pre-computed word-auth stored in Operation 1001, and comparing the two.

If recomputed "word auth" equals the pre-computed word-auth read from memory, continue because all is well. Otherwise (not equal), assume an error has been identified, thus enter error correction sequence.

A suitable error correction sequence flow, including testing possible error corrections, is shown in FIG. 7 and may include all or any subset of the following operations, suitably ordered e.g. as follows, and may also be controlled or put into effect by error correction functionality which may be software-implemented and may reside e.g. in processor 1 of FIG. 1:

Operation 1006—perform error correction on content to be corrected including the word and its associated word auth, combined e.g. concatenated thereby to provide a combined string of bits. Error correction includes: scan all bits, flip each bit (if aiming to correct' one-bit errors, and/or each pair of bits, if aiming to correct two-bit errors) in the combined string of bits and recheck the word auth. Do not compare to the word auth stored in memory because the error may be in the word auth, not in the word. Instead, flip a bit, recompute the word auth and compare recomputed word auth e.g. to the word auth that is available on hand. For example, a structure of X bits of data and Y bits of auth may be read from memory. Bits then are flipped in the combined structure. If the bit being flipped is within the X bits of data, re-compute the auth for the corrected X bits of data and compare that re-computed auth to Y bits of auth that were read from the memory.

If the bit being flipped is one of the Y bits of auth, re-compute the auth for the X bits of data read from memory and compare to the corrected Y bits of auth.

If a match is found (comparison finds equality between the compared word auth's), this indicates a "consistent" word and word auth, skip to Operation 1009. If no match is found, flip next bit (or pair thereof) and repeat re-computation and comparison. It is appreciated that here and elsewhere, the term "next" may be physically adjacent or may be a bit deemed sequential or next in sequence by virtue of an ordering between bits defined by any suitable heuristic.

Operation 1008—Reaching this point typically means no bit-flip (or pair thereof, for two-bit errors) yielded a workable correction thus error correction has failed on the word-level; thus flag uncorrectable memory contents, e.g. by alerting higher-level software as shown in FIG. 1 and/or halt system, and/or processor 1 may prompt (e.g. by generating a suitable output indication) for higher level recovery e.g. sending the device housing the integrated circuit to a laboratory for human technical support.

Operation 1009—Do "strong auth" including computing a digest e.g. HMAC for the whole memory zone, thereby to yield a strong-auth result. Typically, strong auth yields a digest/MAC/signature.

Operation 10010—Compare the strong auth result to the pre-computed pre-computed strong-auth result stored in memory in Operation 1002. If the results are equal, there is a strong-auth match; otherwise (unequal) there is a strong-auth mismatch.

Operation 10011—If there is a strong auth match—memory contents is qualified after correction, continue using memory as usual e.g. go to Operation 1003

Operation 10012—else i.e. If there is a strong auth mismatch—perform mismatch process e.g. as in FIG. 8.

A suitable flow for the mismatch process in Operation 10012, is shown in FIG. 8 and may include all or any subset of the following operations, suitably ordered e.g. as follows, and may also be controlled or put into effect by the error correction functionality:

Operation 10012.5: scan the whole memory 2 in FIG. 1, by redoing Operation 1006, but correct all identified errors.

Operation 10013—redo strong auth by redoing Operations 1009-11.

Operation 10014—If strong auth now fails (i.e. mismatch) assume unable to correct thus higher level of recovery may be needed; thus flag uncorrectable memory contents, e.g. by alerting higher-level software as shown in FIG. 1 and/or halt system, and/or processor 1 may prompt (e.g. by generating a suitable output indication) for higher level recovery such as sending the device housing the integrated circuit to a laboratory for human technical support.

The functionality for testing possible error corrections e.g. as per the method of FIG. 7, may comprise a separate state machine which may be implemented, say, in hardware or firmware. This functionality gets "auth services" from auth functionality, typically including verification of word auth after attempting corrections (e.g. operations 6 above), and/or verifying the whole memory using strong auth (e.g. operations 9-12 above).

Hardware implementation of all or most of the above, would typically yield best performance e.g. because if the entire flow is in hardware, on-the-fly verification is performed by hardware while using the memory, translating into no performance penalty if there is no error.

If almost all implementation is in firmware, on-the-fly word auth may be omitted, instead making do with memory scanning periodically and/or on occasion to check for errors, and then performing correction and verification (e.g. operations 6-12 above) in case an error is found.

If all implementation is in firmware, an existing aka legacy IC may be employed. An existing IC typically has an existing aka legacy memory structure, which may then be rearranged or managed logically in software, to store the word auths computed in the error correction process described herein. In such cases, error detection and correction would typically not be carried out on-the-fly but rather off-line, upon a certain trigger as described above.

Any suitable implementation may be employed to ensure that the functionality for testing possible error corrections interfaces with or gets "auth services" from, the auth functionality, even in an existing or legacy IC in which the legacy auth is configured to compare memory contents to a certain standard (a digest computed right after the most recent authorized memory update, for example). The implementation typically ensures that the auth compares a proposed error to be tested, to that standard; this may be ensured e.g. as follows:

i—FW may read data word+word auth from the memory.
ii—FW may compute the auth for the data word, either itself or using some hardware dedicated for this purpose.
iii—FW may compare the results of the computation to the auth value read from memory, and see whether the data structure is consistent, or has an error.

iv—If the FW identifies an error, the FW may go through the bit flipping process described herein, computing the auth as in operation ii above.

v—Once error correction is done through the memory, the FW may digest the whole memory contents, either by itself, or using some hardware which accelerates or eases the execution of whatever MAC algorithm the designer of the system has chosen for this purpose.

An advantage of certain embodiments herein is error correction which engenders no extra overhead above the overhead for (strong and word, typically) auth which is needed anyway.

Another advantage of certain embodiments herein is that speculative correction of errors (testing various possible error corrections) as described herein sets no hard limit on the number of bits. In contrast, convention error correction implements some kind of error correction code. For a given data size of X bits, to correct a certain, pre-decided number of errors, the number of binary combinations, and the method selected, dictate the numbers of bits required for error correction code. Once implemented, only the pre-decided number of bit errors, and no larger, can be rectified. The practical complexity of correcting errors typically grows with the number of bits one attempts to fix. However, if desired, very strong auth may be used to verify any number of errors corrected, enabling any number of bit errors to be corrected, if reasonable for a given use-case.

Another advantage of certain embodiments herein is that utilization of authentication for verification yields error correction which truly is correct, at a high level of confidence. For example, if strong auth is used to verify proposed corrections, this typically means that once the result of the strong auth on the "rectified data" aka proposed correction, shows a match with (e.g. is equal to) the expected strong auth, this implies cryptographic-level confidence that the rectified data is truly correct.

Another advantage of certain embodiments herein is protection against malicious content change as opposed to prior art systems which implement ECC (error correction code). However, a malicious attack may replace both the data and the error correction code, in a mutually consistent manner, such that the error appears to have been rectified, whereas in fact the content or code is bad or malicious. In contrast, by virtue of using auth for error correction as described herein, an attacker becomes unable to maliciously replace the data and the auth code as above, because the method herein is cryptographically strong.

It is appreciated that use of on-the-fly authentication may be particularly advantageous since performance remains unimpaired (authentication takes place in parallel) and/or data that has been read can be used right away, without delay, unless it is found to contain error/s.

Any memory e.g. code execution memory or large data blobs which are persistent or not often changed and/or especially if access to the memory content is controlled e.g. memory content which changes only via a secured or controlled (firmware) update, can benefit from the flow of FIG. 2, especially if the memory is unprotected or external. Memory which can benefit from the flow of FIG. 2 includes but is not limited to EEPROM, hard-disc, NAND-flash, NOR-flash, SDRAM, SRAM.

It is appreciated that various solutions exist for controlled access to memory, other than secured (firmware) updates. In particular, various technologies are known which allow access to memory content to be tightly controlled, such as but not limited to memory whose content can only be executed aka execute-only memory, or memory whose content can only be read, and which can only be updated or written to via a dedicated gateway after obtaining certain access privilege or authenticating, or memory that can only be written to after changing access control settings which are alterable only when having a certain access privilege.

Re memory content not often changed: For example, some memory content may be known to change typically at a frequency which is low enough, to cause the overhead engendered by the system and method described herein, to be cost effective. For example, code may be known to change only once every few months, say due to software updates occurring periodically or occasionally. Or, certain data may be known to change only once every few days or weeks, or may be known to change on average at those intervals. In contrast, some data may be manipulated by software, hence may change each time a program is executed or run.

Many variations are possible.

For example, according to some embodiments, an error is rectified aka corrected as soon as it is encountered, and the memory is then immediately repaired; after which whatever processes were being run, continue running.

Alternatively or in addition, an overlay patch may be provided to enable the device to continue running, by deferring actual memory content repair until later. This may be advantageous because NVM handling, which may be lengthy rather than causing delays as the device attempts to get this done online, is instead taken off line and done later, such that the device is able to continue running. The cached in dedicated override patch (NV or volatile) may reside in any computer memory, typically on the same IC, which is accessible to whichever processor/s are using the target memory, so as to be pulled out in case of need for target memory recovery.

Another example of possible variations is that any suitable authentication may be used to test possible error corrections, including but not limited to strong and word level auth, separately or in any suitable combination. It is even possible to detect errors based on strong auth over the whole memory, albeit inefficient in many contexts, if the flow demands going through the strong auth to just identify that an error exists in the memory, and once the error has been identified to exist, each memory bit may be flipped and then strong auth may be used to verify bit flips (or pairs thereof). Yet, although strong auth is a heavy, i.e. long and resource consuming, operation, this may be a perfectly viable implementation for small memory zones, for which there may be no need to provide two levels of auth.

In many use cases, use of 2 levels (termed herein word and strong, and more generally differing in heaviness i.e. the former being less long and/or consuming less resources and the latter being longer and/or consuming more resources) is useful to ensure the process is efficient.

For large memory zones, having the word auth, which is quite common, typically results in a much more efficient process, because errors may be detected on a word basis aka on the word level, and basic verification of proposed aka speculative corrections may also occur at the word level, thus strong auth to qualify or verify the correction need not be run too often, relative to embodiments in which the word-level auth is omitted.

EXAMPLES

Example i: speculate a proposed correction, apply the proposed correction, then strong auth to verify the correction. If this fails, try again—speculate another correction, etc.

Example ii: speculate a proposed correction, check word auth, if fails—speculate another proposed correction and again use word auth to check; continue until obtaining successful word auth. Then, use strong auth to finally verify the correction. Workable also without word auth.

Another possible variation is that any suitable method may be used to actually make a verified proposed correction, on memory contents. For example, if the memory content is code, a power-fail safe code recovery update process may be used to correct the code to apply the verified proposed correction to the code which, e.g. by having failed authentication, was found to be erroneous.

Variations may be designed, depending on performance-area-runtime-reliability tradeoffs, such as but not limited to:

A. Larger 'on-the-fly code word' yields:
  Smaller flash area & fetch throughput overhead (for a given 'redundancy' width)
  Larger bit correction time (to scan all bits)
  Larger fetch latency (if waiting for check before execute, the method of US20140082721 may be used; this co-pending patent document (https://patents.google.com/patent/US20140082721A1/en?oq=13%2f965%2c256) whose disclosure is hereby incorporated by reference describes a computing device, comprising:
  a. an input bridge, coupled to receive a sequence of data items for use by the device in execution of a program; and an output bridge;
  b. a processing core, coupled to receive the data items from the input bridge and execute the program so as to cause the output bridge to output a signal in response to a given data item in the sequence; and
  c. authentication logic, coupled to receive and authenticate the data items while the processing core executes the program, and to inhibit output of the signal by the output bridge until the given data item has been authenticated.

B. Larger 'on-the-fly redundancy word' yields the following, relative to a smaller choice:
  More secured, more reliable, faster correction
  Larger flash area & fetch throughput overhead C. Larger 'strong auth' size (in bits) yields the following, relative to a smaller choice:
  More secured i.e. greater confidence that the authenticated original or corrected content of the memory is correct.
  Larger flash area overhead (typically negligible)
  SHA256-512 HMAC seems like a good choice D. Smaller code segmentation (when dividing code into segments with 'strong auth' for each) yields the following, relative to a larger choice:
  Larger area overhead
  Faster correction time
  Boot/cycle runtime may be maintained if the HASH is accumulative, i.e., use one HASH for the whole code while keeping intermediate results to speed up the correction process.

One recommendation is dynamically determining tradeoff parameter/s e.g. choosing different (larger or smaller) 'on-the-fly redundancy words' and/or different (larger or smaller) 'strong auth' size and/or different (larger or smaller) segmentation (when dividing code into segments with 'strong auth' for each), per flash statistics and/or per wear level. e.g. as the target memory gets old, change the aforementioned tradeoff parameters towards faster and more robust correction than the speed and/or robustness of error correction used when the target memory was younger (e.g. due to slower operation of an older and/or more worn flash, relative to a younger and/or less worn flash).

According to some embodiments, on-the-fly 'word auth' with statistic correction is provided. Rather than performing brute-force aka dumb scanning of all single bit flip options (possible corrections) throughout whole target memory, instead, if error is detected in a given word, take a "short cut" (vs. the dumb embodiment) by:
  trying to rectify just the given word, again by scanning or searching all one-bit flips of just that word, and
  if/when the payload word can be corrected to be consistent with the auth word, invoke the strong auth as the supreme verification of memory contents integrity.

Thus, embodiments of this invention include inter alia:

A. a method for combined authentication/error correction, including:
  invoking strong auth as verification of integrity of at least a portion of target memory contents, including scanning of at least some single bit flip options throughout at least some of target memory.

b. ("dumb" embodiment:) a method according to embodiment a wherein the scanning is performed for the entire target memory c. (on-the-fly 'word auth' with statistical correction embodiment:) a method according to embodiment a wherein word auth is employed and wherein, if auth error is detected in a given word, the scanning is performed for just that given word rather than for the entire target memory, thereby to try to rectify just the given word, and if/when the payload word is brought to consistency with the auth word, invoke the strong auth as the supreme verification of memory contents integrity.

It is appreciated that in statistical correction, there is no guarantee of success in correcting the memory contents.

In FIG. 1, re "other processor functions', it is appreciated that the illustrated processor may have any main functionality other than the specific functionalities described herein, and may use any peripherals such as but not limited to all or any subset of: timers, comm channels, converters.

Figure 10:
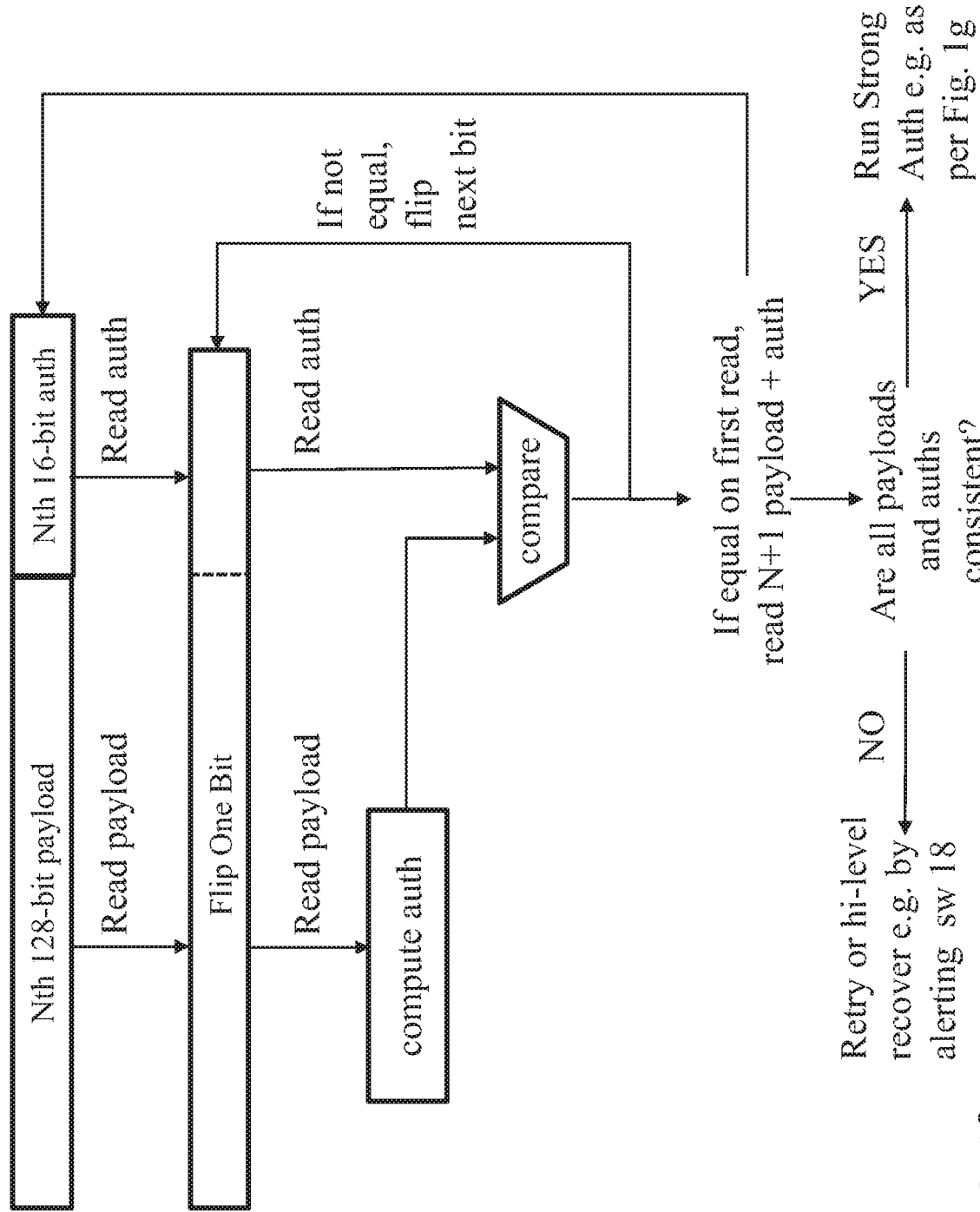
FIG. 10 is a diagram of Scanning and Error Correction functionality according to certain embodiments; it is appreciated that bit/s can be flipped sequentially, or in an order based on any suitable heuristic.
Figure 11:
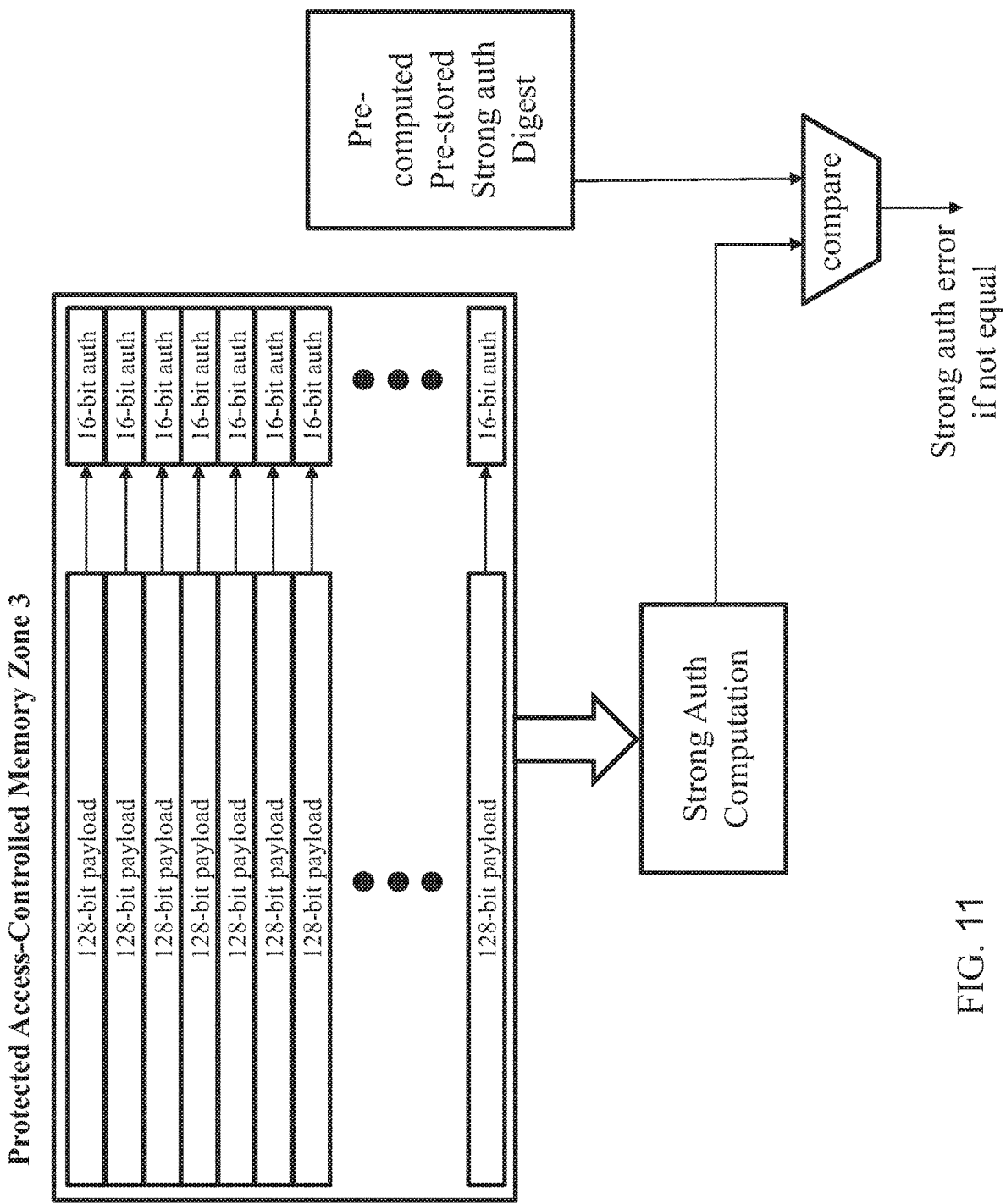
FIG. 11 is a diagram of memory zone 3 of FIG. 1, also showing strong auth comparison functionality.
Figure 12:
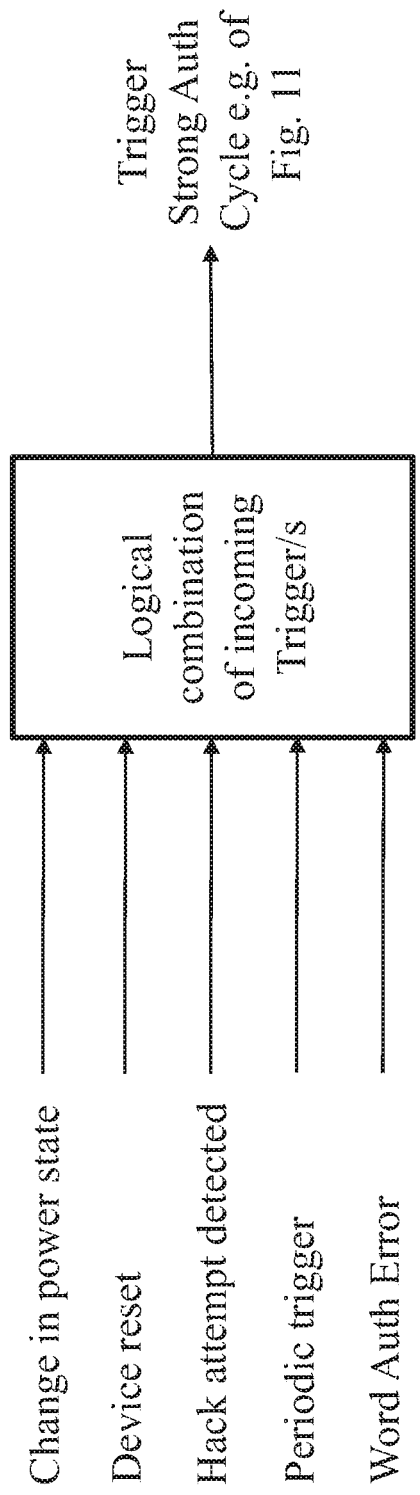
FIG. 12 is a diagram showing how a strong auth cycle may be triggered, according to certain embodiments.

Re scanning ("Flip one bit") in FIG. 10, this may e.g. be implemented in hw and/or sw, using any suitable permutation scanning process known to ordinarily skilled logic designers and software designers.

Figure 9:
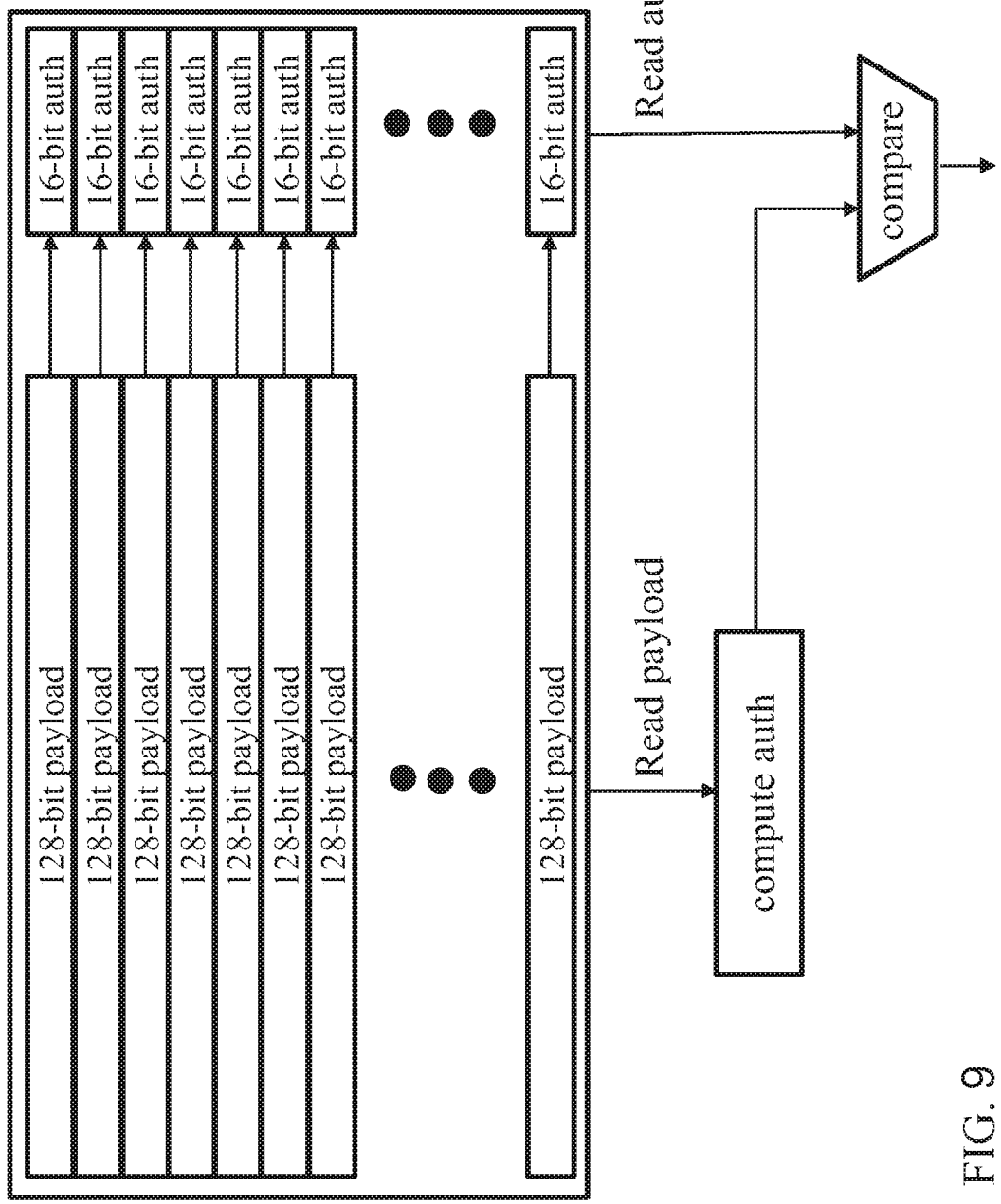
FIG. 9 is a diagram of memory zone 3 of FIG. 1, also showing word auth comparison functionality. Payload and auth sizes are indicated merely by way of example and may instead have any other value.

Re "compute auth" in FIGS. 9 and/or 10, this may comprise on-line word-auth computation. It is appreciated that word auth can have different levels of strength, wherein, typically, there is a trade-off between strength and performance. If strength is taken to an extreme, it is possible to assume that the word-auth may be the final verdict for the correction. In such cases, strong auth becomes optional. Thus either word auth, alone, may be used, or strong auth, alone, may be used, or both may be used, in which case word auth may be simplified (may be performed at a lower level of strength, thereby to yield better performance), relying on strong auth for the final verdict.

Firmware, if used to implement certain embodiments herein, may be held in non-volatile memory, e.g. Flash or ROM.

Alternatively, certain embodiments described herein may be implemented partly or exclusively (i.e. without firmware) in hardware in which case some or all of the variables, parameters, sequential operations and computations described herein may be in hardware.

It is appreciated that terminology such as "mandatory", "required", "need" and "must" refer to implementation choices made within the context of a particular implementation or application described herewithin for clarity and are not intended to be limiting, since, in an alternative implementation, the same elements might be defined as not mandatory and not required, or might even be eliminated altogether.

Features of the present invention, including operations, which are described in the context of separate embodiments, may also be provided in combination in a single embodiment. For example, a system embodiment is intended to include a corresponding process embodiment and vice versa. Features may also be combined with features known in the art and particularly, although not limited to those described in the Background section or in publications mentioned therein. Conversely, features of the invention, including operations, described for brevity in the context of a single embodiment or in a certain order may be provided separately or in any suitable sub-combination, including with features known in the art (particularly although not limited to those described in the Background section or in publications mentioned therein) or in a different order. "e.g." is used to denote an example not intended to be limiting. Each method may comprise some or all of the operations illustrated or described, suitably ordered e.g. as illustrated or described herein.

The invention claimed is:

1. A self-correcting memory system comprising:
   an integrated circuit including:
   memory and
   memory content authentication functionality, which is operative to compare content to be authenticated to a standard and to output "authentic" if the content to be authenticated equals the standard and "non-authentic" otherwise; and
   error correction functionality which is operative to apply at least one possible correction to at least one erroneous word entity in said memory, yielding a possibly correct word entity, call said authentication for application to the possibly correct word entity, and if the authentication's output is "authentic", to replace said erroneous word entity in said memory, with said possibly correct word entity,
   wherein said authentication functionality is operative to perform cryptographically strong authentication,
   wherein said authentication functionality is also operative to perform word-authentication,
   wherein said strong authentication yields a single value that vouches for a body of data within which at least one erroneous word is replaced with its proposed correction, and wherein said word-authentication is performed on said word replaced with its proposed correction.

2. The system according to claim 1 wherein said error correction functionality is configured for:
   applying at least one possible correction to at least one erroneous word in said memory, yielding a possibly correct word,
   calling said word-authentication for application to the possibly correct word,
   if the word-authentication's output is "authentic", subsequently calling said strong authentication for application to an entire memory image/chunk including the possibly correct word, and
   if the strong-authentication's output is "authentic", to replace said erroneous word in said memory, with said possibly correct word,
   thereby to yield error correction at a level of confidence derived from the level of confidence associated with the strong authentication and/or word-authentication.

3. The system according to claim 1 wherein said erroneous word is detected by word-authentication applied to at least one word in said memory and wherein any word which yields a "non-authentic" output is considered erroneous and any word which yields an "authentic" output is considered non-erroneous.

4. The system according to claim 1 wherein said correction comprises a flip of at least one bit in the erroneous word entity from 0 to 1 or from 1 to 0.

5. The system according to claim 1 wherein possible corrections are applied to plural erroneous words yielding plural possibly correct words, and wherein said strong authentication is called once for application to a revised memory image/chunk in which all of said plural erroneous words are replaced with said possibly correct words respectively, rather than calling said strong authentication plural times for application to memory images/chunks respectively including said plural possibly correct words respectively, thereby to save memory and/or correction time.

6. The system according to claim 1 wherein at least first and second possible corrections are applied to at least one erroneous word and wherein any bit in the erroneous word which is flipped in the first correction is unflipped before the second possible correction is applied to said erroneous word, thereby to undo the first possible correction of the erroneous word before applying the second possible correction to the same erroneous word.

7. The system according to claim 6 wherein all possible corrections are applied to at least one erroneous word.

8. The system according to claim 7 wherein said erroneous word to which all possible corrections are applied comprises an erroneous word for which none of the possible corrections tried results in correct word authentication, until the last possible correction is tried, in which case the erroneous word is regarded as uncorrectable.

9. The system according to claim 6 wherein at least one heuristic is employed to determine a subset of possible corrections including less than all possible corrections and wherein only possible corrections in the subset are applied to at least one erroneous word, even if none of the possible corrections in the subset results in correct word authentication.

10. The system according to claim 1 wherein said authentication functionality, operative to compare content to be authenticated to a standard, is operative to apply strong auth to said content to be authenticated which is stored at a given memory location, at a time t2, thereby to yield a "computed" auth value, and to compare said computed auth value to a stored result, aka expected auth value, generated by applying strong auth to content of said memory, at said given memory location, at a previous time t1 earlier than t2 at which time the authenticity of memory contents is known to be correct.

11. The system according to claim 10 wherein said previous time t1 is a time at which a firmware update of said memory occurred.

12. The system according to claim 1 wherein said error correction functionality is operative to apply at least one possible correction to at least one erroneous word in said memory, yielding a possibly correct word, to call said authentication for application to the possibly correct word, and if the authentication's output is "authentic", to replace said erroneous word in said memory, with said possibly correct word.

13. The system according to claim 1 wherein said error correction functionality is operative to apply at least one possible correction to at least one erroneous word entity's word auth, yielding a possibly correct word entity, to call said authentication for application to the possibly correct word entity, and if the authentication's output is "authentic", to replace said erroneous word auth in said memory, with said possibly correct word auth.

14. The system according to claim 1 wherein at least one heuristic is employed to order the possible corrections such that possible corrections ordered earlier would have greater a priori chances to be correct than possible corrections ordered later, thereby to shorten expected overall correction time.

15. The system according to claim 1 wherein said memory content authentication functionality performs cryptographic authentication of memory content.

16. The system according to claim 1 wherein said erroneous word entity includes multiple bits and wherein said at least one possible correction comprises plural possible corrections each comprising a flip of at least one of said erroneous word entity's multiple bits, thereby to define plural flips, each of said plural flips flipping at least one of said erroneous word entity's multiple bits.

17. The system according to claim 16 wherein each of said plural flips is operative to flip exactly one of said erroneous word entity's multiple bits.

18. The system according to claim 16 wherein each of said plural flips is operative to flip no more than two of said erroneous word entity's multiple bits.

19. A method for providing a self-correcting memory system, the method comprising:
  providing an integrated circuit including memory and memory content authentication functionality, which is operative to compare content to be authenticated to a standard and to output "authentic" if the content to be authenticated equals the standard and "non-authentic" otherwise; and
  applying at least one possible correction to at least one erroneous word entity in said memory, yielding a possibly correct word entity, calling said authentication for application to the possibly correct word entity, and, each time the authentication's output is "authentic", replacing said erroneous word entity in said memory, with said possibly correct word entity,
  wherein said authentication functionality is operative to perform cryptographically strong authentication,
  wherein said authentication functionality is also operative to perform word-authentication, and
  wherein said strong authentication yields a single value that vouches for a body of data within which at least one erroneous word is replaced with its proposed correction, and wherein said word-authentication is performed on said word replaced with its proposed correction.

20. The method according to claim 19 which provides error correction functionality for memory content which resides on an integrated circuit's target (non-volatile or volatile) memory, the method comprising at least once:
  detecting an error in memory content residing in target memory
  searching, through at least some bit-permutations constituting respective possible fixes of the error, for at least one on-the-fly signature match,
  thereby to define a proposed fix which achieves successful strong auth
  if at least one on-the-fly signature match is found, using overall authentication as a final verification for said proposed fix, and
  if verified, correct said code, using a power-fail safe code recovery update process,
  thereby to provide error correction for said target memory without taking the target memory to a lab.

21. The method according to claim 20 and also comprising providing an output indication that memory recovery is needed e.g. by taking at least the target memory to a lab for secured, complete reprogramming, because memory content correction has failed.

22. The method according to claim 21 wherein, before providing said output indication, said searching is performed only over single-bit permutations of said error.

23. The method according to claim 21 wherein, before providing said output indication, said searching is performed over all single-bit and double-bit permutations of said error.

24. The method according to claim 21 wherein, before providing said output indication, said searching is performed over all single-bit permutations of said error and if no match is found, then said searching is again performed, this time over at least some double-bit permutations of said error.

25. The method according to claim 21 wherein, before providing said output indication, said searching is performed at least one more time over single-bit permutations of said error.

26. The method according to claim 20 and also comprising protecting memory content residing on target memory, before said detecting, both by strong-auth performed once and by on-the-fly word auth.

27. The method according to claim 26 wherein said strong-auth performed once comprises strong-auth performed just after the integrated circuit wakes up from a less active state.

28. The method according to claim 27 wherein said strong-auth performed once comprises strong-auth performed just after the integrated circuit powers-up.

29. The method according to claim 27 wherein said strong-auth performed once comprises strong-auth performed just after the integrated circuit exits a sleep state.

30. The method according to claim 20 wherein said memory content comprises code stored in the target memory.

31. The method according to claim 20 which yields error correction at a level of confidence derived from the level of confidence associated with the authentication.

32. The system according to claim 19 and wherein said strong authentication authenticates at a higher level of confidence than said word-authentication.

33. A self-correcting memory system comprising:
  an integrated circuit including:
    a memory; and
    memory content authentication functionality, which is operative to compare content to be authenticated to a standard and to output "authentic" if the content to be authenticated equals the standard and "non-authentic" otherwise; and
    error correction functionality which is operative to apply at least one possible correction to at least one erroneous word entity in said memory, yielding a possibly correct word entity, call said authentication for application to the possibly correct word entity, and if the authentication's output is "authentic", to replace said erroneous word entity in said memory, with said possibly correct word entity
  wherein at least first and second possible corrections are applied to at least one erroneous word and wherein any bit in the erroneous word which is flipped in the first correction is un-flipped before the second possible correction is applied to said erroneous word, thereby to undo the first possible correction of the erroneous word before applying the second possible correction to the same erroneous word.

34. A self-correcting memory system comprising:
an integrated circuit including:
  a memory;
  memory content authentication functionality, which is operative to compare content to be authenticated to a standard and to output "authentic" if the content to be authenticated equals the standard and "non-authentic" otherwise; and
  error correction functionality which is operative to apply at least one possible correction to at least one erroneous word entity in said memory, yielding a possibly correct word entity, call said authentication for application to the possibly correct word entity, and if the authentication's output is "authentic", to replace said erroneous word entity in said memory, with said possibly correct word entity,
  wherein said erroneous word entity includes multiple bits and wherein said at least one possible correction comprises plural possible corrections each comprising a flip of at least one of said erroneous word entity's multiple bits, thereby to define plural flips, each of said plural flips flipping at least one of said erroneous word entity's multiple bits.

35. A method for providing a self-correcting memory system, the method comprising:
  providing an integrated circuit including a memory and memory content authentication functionality, which is operative to compare content to be authenticated to a standard and to output "authentic" if the content to be authenticated equals the standard and "non-authentic" otherwise; and
  applying at least one possible correction to at least one erroneous word entity in said memory, yielding a possibly correct word entity, calling said authentication for application to the possibly correct word entity, and, each time the authentication's output is "authentic", replacing said erroneous word entity in said memory, with said possibly correct word entity,
  wherein at least first and second possible corrections are applied to at least one erroneous word and wherein any bit in the erroneous word which is flipped in the first correction is unflipped before the second possible correction is applied to said erroneous word, thereby to undo the first possible correction of the erroneous word before applying the second possible correction to the same erroneous word.

36. A method for providing a self-correcting memory system, the method comprising:
  providing an integrated circuit including a memory and memory content authentication functionality, which is operative to compare content to be authenticated to a standard and to output "authentic" if the content to be authenticated equals the standard and "non-authentic" otherwise; and
  applying at least one possible correction to at least one erroneous word entity in said memory, yielding a possibly correct word entity, calling said authentication for application to the possibly correct word entity, and, each time the authentication's output is "authentic", replacing said erroneous word entity in said memory, with said possibly correct word entity,
  wherein said erroneous word entity includes multiple bits and wherein said at least one possible correction comprises plural possible corrections each comprising a flip of at least one of said erroneous word entity's multiple bits, thereby to define plural flips, each of said plural flips flipping at least one of said erroneous word entity's multiple bits.

* * * * *